United States Patent

Druse, Sr.

Patent Number: 5,123,800
Date of Patent: Jun. 23, 1992

[54] BALE CARRIER

[76] Inventor: Charles R. Druse, Sr., P.O. Box 40, Cambridge, Nebr. 69022

[21] Appl. No.: 704,053

[22] Filed: May 22, 1991

[51] Int. Cl.⁵ .............................................. B60P 01/24
[52] U.S. Cl. .................................. 414/470; 298/8 R; 298/17.6; 298/18; 414/24.5
[58] Field of Search ......................... 280/404; 296/6; 298/8 R, 17.6, 17.7, 18; 414/24.5, 470; 105/278

[56] References Cited

U.S. PATENT DOCUMENTS

| | | | |
|---|---|---|---|
| 2,032,840 | 3/1936 | Flowers | 298/17.7 |
| 3,826,515 | 7/1974 | Slayton | 280/106 T |
| 4,092,050 | 5/1978 | Sobeck | 298/18 |
| 4,138,159 | 2/1979 | Hall | 298/18 |
| 4,261,676 | 4/1981 | Balling, Sr. | 414/24.5 |
| 4,411,572 | 10/1983 | Hostetler | 298/18 X |
| 4,470,747 | 9/1984 | Tichenor | 414/491 |
| 4,500,242 | 2/1985 | Beikman | 414/24.5 |
| 4,580,843 | 4/1986 | Lund | 298/18 |

Primary Examiner—Robert J. Spar
Assistant Examiner—Janice Krizek
Attorney, Agent, or Firm—Zarley, McKee, Thomte, Voorhees & Sease

[57] ABSTRACT

A bale carrier comprising a wheeled frame having a plurality of bale cradles pivotally mounted, about a horizontal axis, thereon. The bale cradles may be selectively pivoted toward either side of the wheeled frame so that the bales may be dumped from either side of the carrier. A locking mechanism is provided for each of the bale cradles for preventing the dumping of the bales therefrom until the desired time.

3 Claims, 5 Drawing Sheets

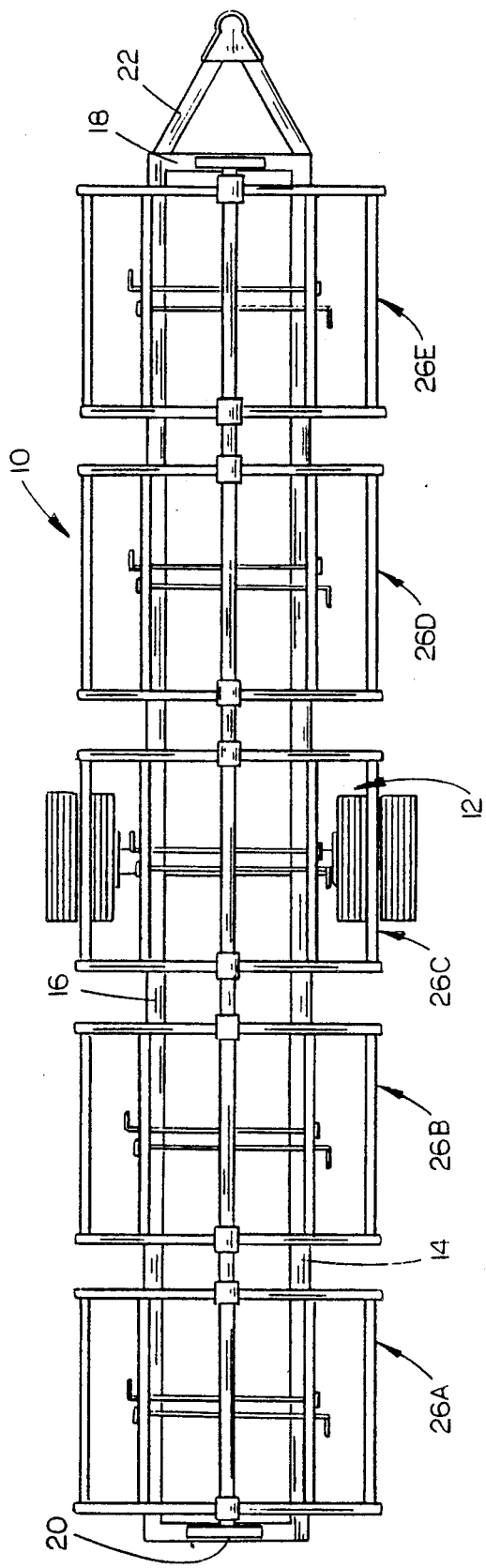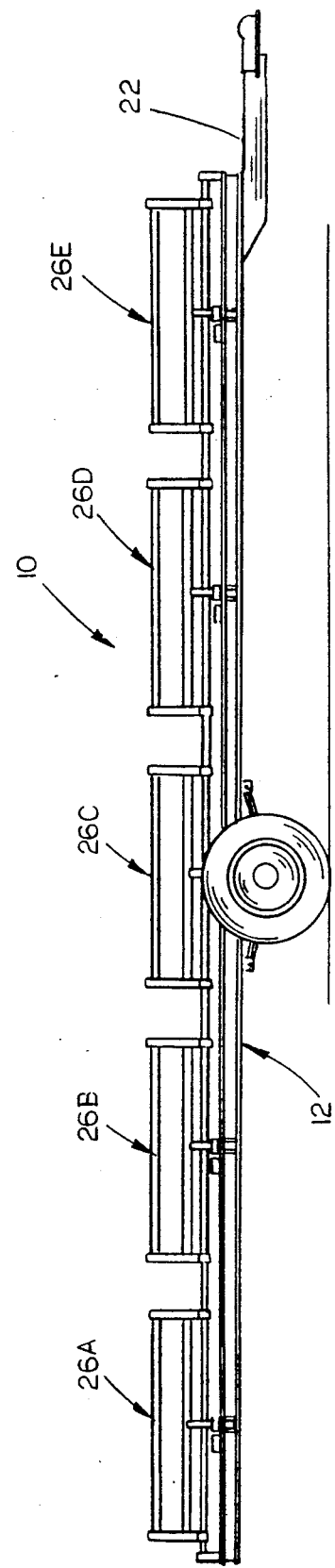

BALE CARRIER

BACKGROUND OF THE INVENTION

Many types of apparatuses have been previously provided for carrying or transporting large round hay bales. However, the bale carriers of the prior art, of which Applicant has knowledge, do not have the ability to discharge the bales therefrom at either side of the wheeled frame means which may take the form of a pick-up truck, truck or trailer.

It is therefore a principal object of the invention to provide an improved bale carrier.

Still another object of the invention is to provide an improved bale carrier wherein the bales carried thereon may be dumped from either side of the apparatus.

Still another object of the invention is to provide a bale carrier including means for dumping the bales from either side of the trailer but which only can be actuated from the opposite side of the trailer or the like to prevent injury to the person operating the bale carrier.

Still another object of the invention is to provide a bale carrier which is economical of manufacture, durable in use and refined in appearance.

These and other objects of the present invention will be apparent to those skilled in art.

BRIEF DESCRIPTION OF THE DRAWINGS

FIG. 2 is a top view of the bale carrier of this invention;

FIG. 3 is a side view similar to FIG. 1 except that bales are not loaded on the carrier;

SUMMARY OF THE INVENTION

Figure 1:
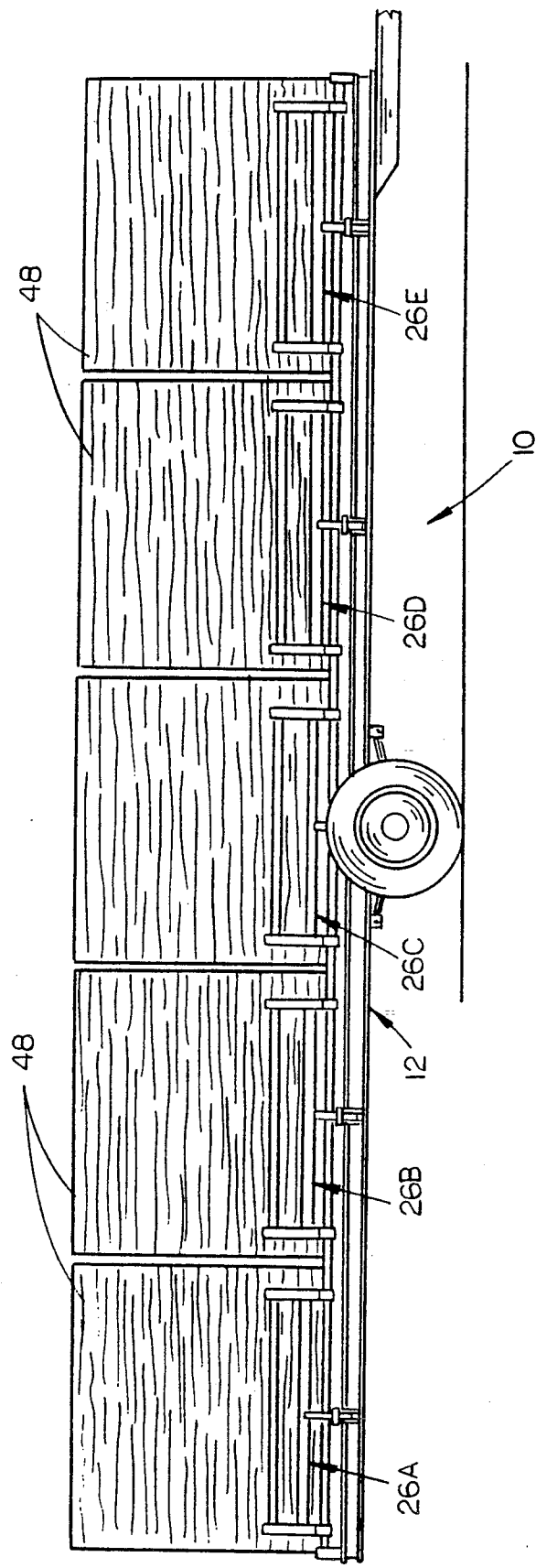
FIG. 1 is a side view of the bale carrier of this invention.

A bale carrier is described which comprises a wheeled frame means which may take the form of a pick-up truck, truck or trailer. At least one, and preferably two or more bale cradles are mounted on the wheeled frame means and are pivotally mounted thereon, about a horizontal axis, and are adapted to support a round bale thereon. When in the normal bale carrying position, the bale is supported on its cradle to enable the bale to be transported from one location to another. When the bale has been transported to the desired location, the bale may be dumped from either side of the wheeled frame means. The actuator for the bale dumping apparatus can only be operated from the side opposite from where the bale is being dumped.

DESCRIPTION OF THE PREFERRED EMBODIMENT

The bale carrier of this invention is referred to generally by the reference numeral 10. It should be noted that the bale carrier 10 in the drawings is illustrated as comprising a trailer. However, the bale carrying apparatus of this invention could be mounted on a pick-up truck or truck.

Bale carrier 10 includes a wheeled frame means 12 including longitudinally extending frame members 14 and 16 having a front frame member 18 connecting the forward ends thereof and a rear frame member 20 connecting the rearward ends thereof. Hitch 22 is provided at the forward end of the trailer to enable the trailer to be pulled from one location to another. The numeral 24 refers to a longitudinally extending frame member in the form of a pipe or the like which is positioned between the frame members 14 and 16 as illustrated in the drawings. A plurality of bale cradles 26A, 26B, 26C, 26D and 26E are pivotally mounted on the pipe 24 as will be described in more detail hereinafter. Any number of the bale cradles may be utilized. Inasmuch as each of the bale cradles 26A–26E is identical, only cradle 26A will be described in detail.

Figure 4:
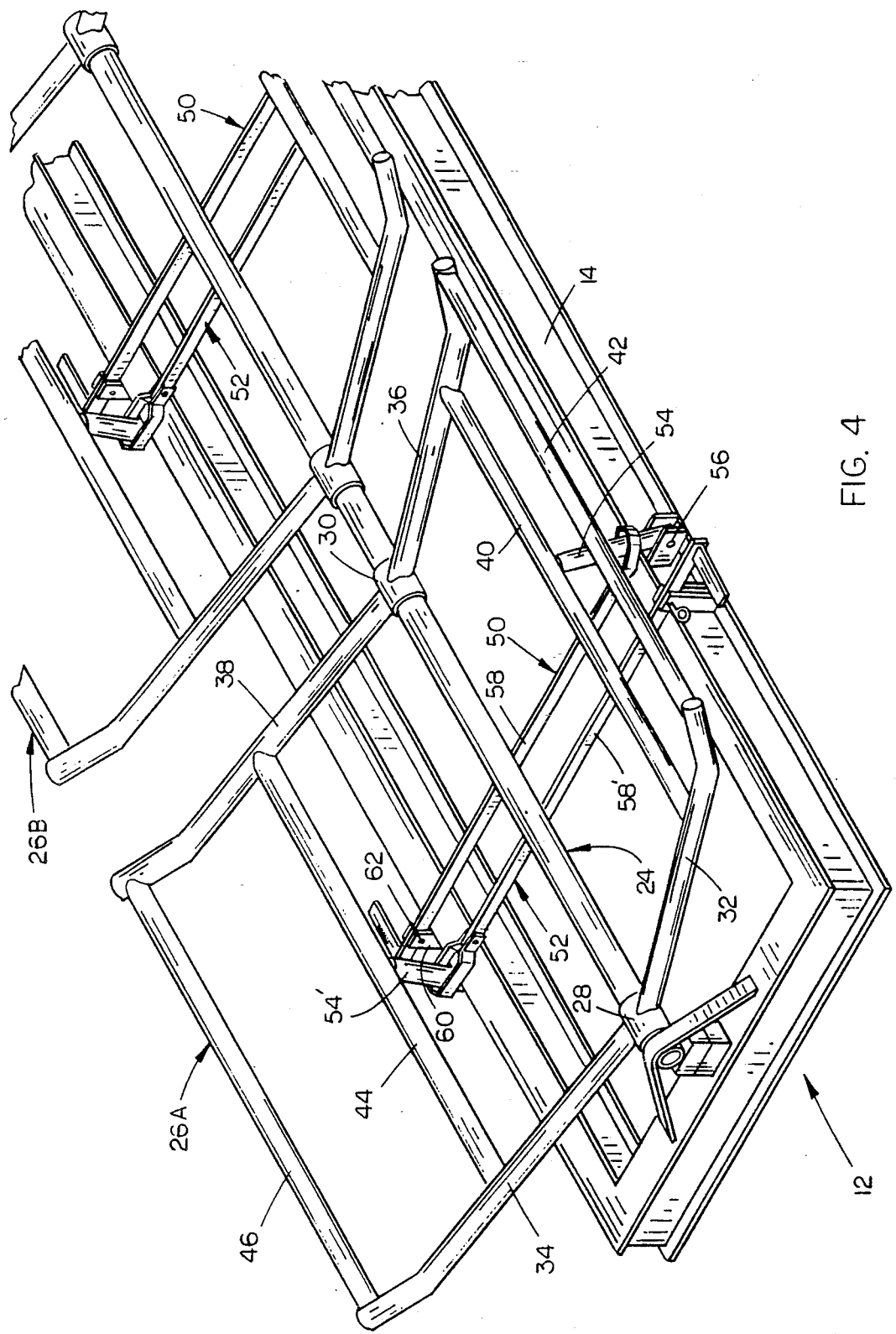
FIG. 4 is a partial perspective view of the bale carrier of this invention.

Cradle 26A includes a pair of sleeves or collars 28 and 30 which are rotatably mounted on pipe 24 as illustrated in FIG. 4. Support arms 32 and 34 are welded or otherwise secured to sleeve 28 and extend outwardly and upwardly therefrom. Similarly, support arms 36 and 38 are welded or otherwise secured to sleeve 30 and extend outwardly and upwardly therefrom. Support arms 40 and 42 are welded or otherwise secured to support 32 and 36 and extend therebetween as seen in FIG. 4. Similarly, support arms 44 and 46 are secured to support arms 34 and 38 and extend therebetween.

Figure 5:
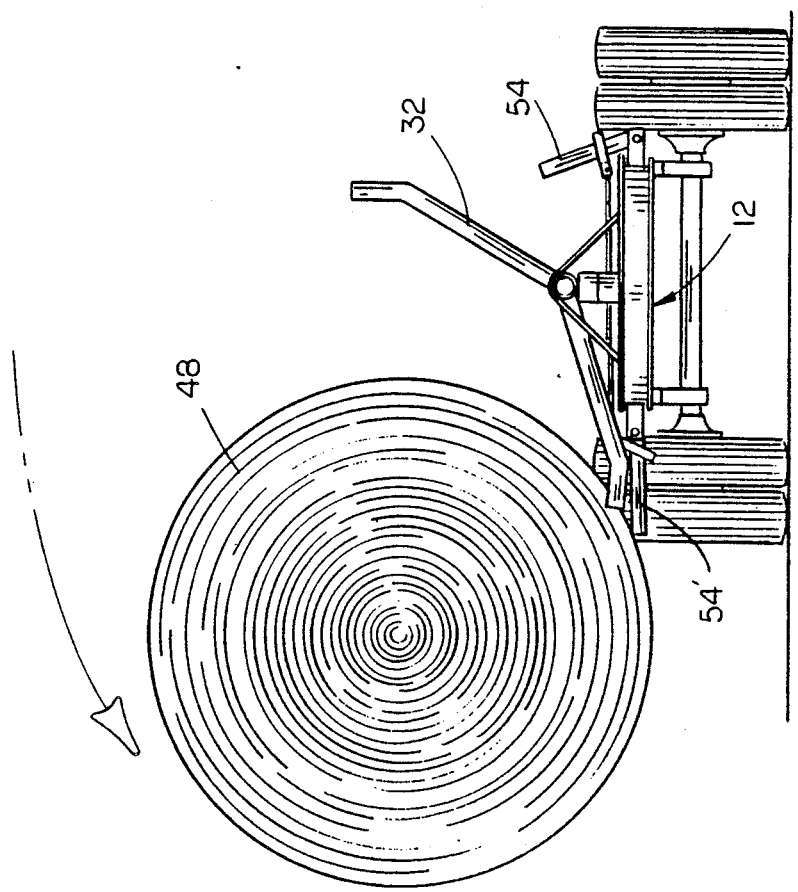
FIG. 5 is a rear view of the bale carrier of this invention.
Figure 6:
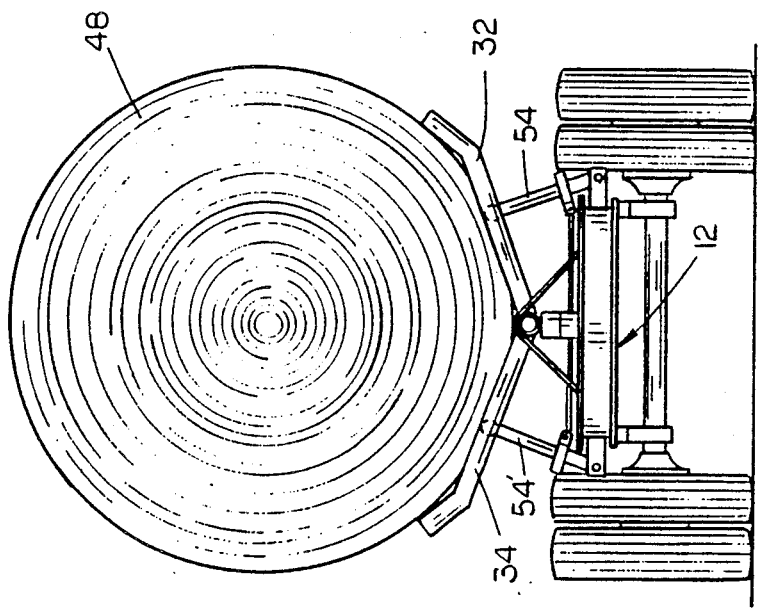
FIG. 6 is a view similar to FIG. 5 except that the bale is being dumped therefrom.
Figure 7:
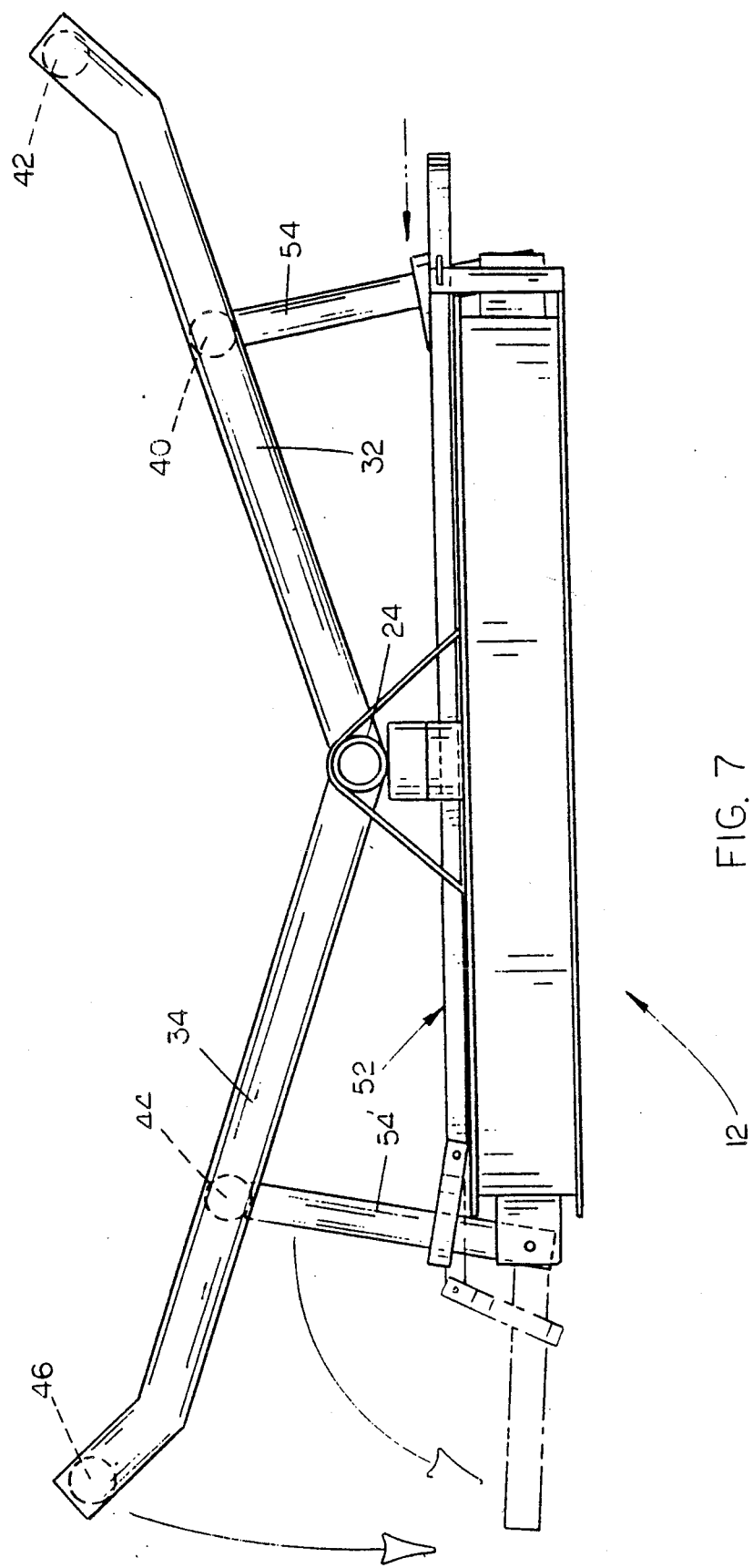
FIG. 7 is a rear elevational view of the bale carrier of this invention illustrating the locking means which prevents the dumping of the bales therefrom.

Cradle 26A is designed to cradle or otherwise support a large round hay bale 48 thereon as illustrated in FIG. 5. The rotatable mounting of cradle 26A on pipe 24 permits the bale to be dumped from either side of the trailer. The numerals 50 and 52 refer to locking mechanisms which are provided to prevent the cradle from being dumped until the desired time. Locking mechanism 50 is comprised of a pipe stub 54 which is pivotally secured at its lower end at 56 to frame member 14. Pipe stub 54 normally extends upwardly from the pivotal connection 56 and rests along the side of frame member 14 and has its upper end closely adjacent to the underside of support arm 40. Thus, when pipe stub 54 is in the position illustrated in FIG. 4, cradle 26A cannot pivotally dump to the right as viewed in FIG. 4 since pipe stub 54 is in the pivotal path of support arm 40. A rather significant safety feature is provided in that the pipe stub 54 can only be pivoted from its locking position, as illustrated in FIG. 4, by means of the actuator arm 58 which is operatively connected to pipe stub 54 and which extends across the trailer towards frame member 16 as seen in FIG. 4. Actuator arm 58 is received by bracket 60 and may be secured thereto by means of a pin 62 extending therethrough. Thus, when it is desired to dump the bale to the right side of the carrier as viewed in FIG. 4, the operator would have to go to the left side of the bale carrier and remove the pin 62 from the actuator arm 58. The operator would then move actuator arm 58 towards frame member 14 so that pipe stub 54 is pivotally moved out of the pivotal path of support arm 40. The bale can then be dumped from the right side of the trailer. It is extremely important to note that the operator will always be at the opposite side of the trailer where the bale is being dumped.

Pipe stub 54' is pivotally secured to frame member 16 in the same fashion as pipe stub 54 is secured to frame member 14. When in the position of FIG. 4, the upper end of pipe stub 54' is in the pivotal path of support arm 44 to prevent cradle 26A from dumping to the left side of the trailer. Pipe stub 54' is controlled by actuator arm 58'.

Thus it can be seen that a novel bale carrier has been provided which not only provides a convenient means for transporting a plurality of hay bales from one location to another but provides a novel means for dumping the hay bales from either side of the trailer. It is also extremely important to note, as previously stated, that operator safety is greatly enhanced since the bale will be dumped from the trailer on the side opposite from where the operator is standing.

Thus it can be seen that the invention accomplishes at least all of its stated objectives.

I claim:

1. A hay bale handling apparatus, comprising,
   a frame means having a forward end, a rearward end, and opposite sides,
   at least one bale cradle selectively pivotally mounted, about a horizontal axis, on said frame means for holding a hay bale,
   said bale cradle being selectively pivotally movable from a normal bale supporting position to a first dumping position whereby the hay bale thereon may be dumped therefrom along one side of said frame means and to a second dumping position whereby the hay bale thereon may be dumped therefrom along the other side of said frame means;
   said frame means having wheels rotatably mounted thereon for transporting said frame means;
   a first pivotal locking means connected to one side of said frame means, which is selectively pivotally movable from a first position, wherein said first locking means is in the pivotal path of said cradle to prevent said cradle from moving to its said first dumping position, to a second position wherein said cradle may move to its said first dumping position;
   a second pivotal locking means connected to the opposite side of said frame means, which is selectively pivotally movable from a first position, wherein said second locking means is in the pivotal part of said cradle to prevent said cradle from moving to its said second dumping position, to a second position wherein said cradle may move to its said second dumping position;
   said first and second locking means comprising:
      upstanding first and second pivotal posts respectively which are in the pivotal paths of said cradle;
      a first arm secured to said first post and extending towards said opposite side of said frame means;
      a second arm secured to said second post and extending towards said one side of said frame means;
      said first and second arms permitting the pivotal movement of said first and second posts respectively from a location on the opposite sides of the frame means; and
      means for positively preventing the inadvertent movement of said arms.

2. The hay bale handling apparatus of claim 1, wherein said at least one bale cradle includes a forward end and a rearward end, and further comprising at least a second bale cradle selectively pivotally mounted on said fame means aligned rearwardly of the rearward end of said at least one bale cradle in end-to-end relationship.

3. The hay bale handling apparatus of claim 1 wherein said first locking means can only be moved to its said second position from a location at said opposite side of said frame means and wherein said second locking means can only be moved to its said second position from a location at said one side of said frame means.

* * * * *